(12) United States Patent
Tomescu

(10) Patent No.: US 11,597,502 B2
(45) Date of Patent: *Mar. 7, 2023

(54) SIGNAL AMPLIFICATION IN BLADE ANGLE POSITION FEEDBACK SYSTEM

(71) Applicant: PRATT & WHITNEY CANADA CORP., Longueuil (CA)

(72) Inventor: Dana Tomescu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 620 days.

This patent is subject to a terminal disclaimer.

(21) Appl. No.: 16/697,084

(22) Filed: Nov. 26, 2019

(65) Prior Publication Data

US 2021/0070426 A1 Mar. 11, 2021

Related U.S. Application Data

(60) Provisional application No. 62/896,163, filed on Sep. 5, 2019.

(51) Int. Cl.

| G01D 5/20 | (2006.01) |
|---|---|
| G01D 5/247 | (2006.01) |
| G01B 7/14 | (2006.01) |
| G01B 7/30 | (2006.01) |
| B64C 13/16 | (2006.01) |

(Continued)

(52) U.S. Cl.
CPC .............. *B64C 13/16* (2013.01); *B64C 11/30* (2013.01); *B64C 11/301* (2013.01); *G01D 5/2013* (2013.01); *G01D 5/2451* (2013.01)

(58) Field of Classification Search
CPC ...... G01D 5/2013; G01D 5/2451; G01D 5/20; G01D 5/247; G01B 7/14; G01B 7/30
See application file for complete search history.

(56) References Cited

U.S. PATENT DOCUMENTS

| 4,934,901 A | 6/1990 | Duchesneau |
|---|---|---|
| 5,897,293 A | 4/1999 | Arel et al. |

(Continued)

FOREIGN PATENT DOCUMENTS

| DE | 102010041444 | 3/2012 |
|---|---|---|
| EP | 0353076 | 1/1990 |

(Continued)

*Primary Examiner* — Neel D Shah
(74) *Attorney, Agent, or Firm* — Norton Rose Fulbright Canada LLP

(57) ABSTRACT

A blade angle feedback system for an aircraft-bladed rotor rotatable about a longitudinal axis and having an adjustable blade pitch angle is provided. A feedback device is coupled to rotate with the rotor and to move along the axis with adjustment of the blade angle. At least one position marker is affixed to a core of the feedback device and extends along a direction angled relative to the axis. The core is made of a first material having a first magnetic permeability and the position marker comprises a second material having a second magnetic permeability greater than the first magnetic permeability. A sensor is positioned adjacent the feedback device and produces, as the feedback device rotates about the axis, a sensor signal in response to detecting passage of the position marker. A control unit generates a feedback signal indicative of the blade angle in response to the sensor signal.

20 Claims, 9 Drawing Sheets

(51) Int. Cl.
*B64C 11/30* (2006.01)
*G01D 5/245* (2006.01)

(56) References Cited

U.S. PATENT DOCUMENTS

| | | | |
|---|---|---|---|
| 5,913,659 | A | 6/1999 | Doolin et al. |
| 6,077,040 | A | 6/2000 | Pruden et al. |
| 7,579,827 | B2 | 8/2009 | Burns et al. |
| 8,687,206 | B2 | 4/2014 | Hockaday |
| 9,427,835 | B2 | 8/2016 | Cheung et al. |
| 9,638,548 | B2 | 5/2017 | Mialtu et al. |
| 9,821,901 | B2 | 11/2017 | Duke et al. |
| 9,823,092 | B2 | 11/2017 | David et al. |
| 10,850,831 | B2 * | 12/2020 | Futa, Jr. ................ B64C 11/303 |
| 11,161,597 | B2 * | 11/2021 | Lauria .................... G01D 5/247 |
| 11,365,691 | B2 * | 6/2022 | Tomescu ................ G01D 5/125 |
| 2014/0007591 | A1 | 1/2014 | Khibnik et al. |
| 2015/0017324 | A1 | 1/2015 | Barnett et al. |
| 2015/0139798 | A1 | 5/2015 | Duke et al. |
| 2018/0050789 | A1 | 2/2018 | Marone et al. |
| 2018/0304991 | A1 * | 10/2018 | Kudrna .................. G01D 5/147 |
| 2021/0156316 | A1 * | 5/2021 | Tomescu ................ G01P 3/488 |

FOREIGN PATENT DOCUMENTS

| | | |
|---|---|---|
| EP | 3730902 | 10/2020 |
| EP | 3744630 | 12/2020 |

* cited by examiner

SIGNAL AMPLIFICATION IN BLADE ANGLE POSITION FEEDBACK SYSTEM

CROSS REFERENCE TO RELATED APPLICATIONS

This patent application claims priority of U.S. provisional Application Ser. No. 62/896,163, filed on Sep. 5, 2019, the entire contents of which are hereby incorporated by reference.

TECHNICAL FIELD

The present disclosure relates generally to engines, and more specifically to blade angle position feedback systems.

BACKGROUND OF THE ART

On featherable aircraft propeller systems, it is desirable to accurately measure the propeller blade pitch (or beta) angle to ensure that the blade angle is controlled according to the engine power set-point requested, such as in reverse and low pitch situations, also known as the beta operating region. For this purpose, some propeller feedback systems use a beta or feedback device, sometimes referred to as a phonic wheel, which rotates with the engine. The feedback device has multiple readable raised markers disposed on an outer surface thereof, and a sensor can be used to measure the rotation of the feedback device via the markers, providing a proxy value for the rotational velocity of the engine, as well as measure blade angle. Existing feedback devices are however vulnerable to a so-called "edge-effect" that leads to an increase in reading error as the sensor approaches the edges of the feedback device. In addition, the geometry of the markers used in some feedback systems can negatively impact the strength of the sensor signal.

Therefore, improvements are needed.

SUMMARY

In accordance with a broad aspect, there is provided a blade angle feedback system for an aircraft-bladed rotor, the rotor rotatable about a longitudinal axis and having an adjustable blade pitch angle. The system comprises a feedback device coupled to rotate with the rotor and to move along the longitudinal axis with adjustment of the blade pitch angle, the feedback device comprising a core and at least one position marker affixed to the core and extending along a direction angled relative to the longitudinal axis, the core made of a first material having a first magnetic permeability and the at least one position marker comprising a second material having a second magnetic permeability greater than the first magnetic permeability, at least one sensor positioned adjacent the feedback device and configured for producing, as the feedback device rotates about the longitudinal axis, at least one sensor signal in response to detecting passage of the at least one position marker, and a control unit communicatively coupled to the at least one sensor and configured to generate a feedback signal indicative of the blade pitch angle in response to the at least one sensor signal received from the at least one sensor.

In some embodiments, the at least one position marker is at least one first position marker, and the feedback device further comprises a plurality of second position markers affixed to the core and fabricated from the first material, the second position markers circumferentially spaced around the feedback device and extending substantially parallel to the longitudinal axis with the at least one first position marker positioned between two adjacent ones of the second position markers.

In some embodiments, the at least one sensor is configured to produce the at least one sensor signal comprising at least one first series of pulses generated in response to detecting passage of the at least one first position marker, each pulse of the first series of pulses having a first amplitude above a predetermined threshold.

In some embodiments, the at least one sensor is configured to produce the at least one sensor signal comprising at least one second series of pulses generated in response to detecting passage of the second position markers, each pulse of the second series of pulses having a second amplitude above the predetermined threshold.

In some embodiments, the first amplitude is substantially equal to the second amplitude.

In some embodiments, the second material is applied to the at least one position marker using one of coating and plating.

In some embodiments, the second material is applied to an entire exposed surface of the at least one position marker.

In some embodiments, the second material is applied to at least a tip of the at least one position marker.

In some embodiments, the second material has a relative magnetic permeability between 80,000 and 100,000.

In accordance with another broad aspect, there is provided an aircraft-bladed rotor system, comprising a rotor rotatable by a shaft about a longitudinal axis, the rotor having blades with adjustable blade pitch angle, a feedback device coupled to rotate with the rotor and to move along the longitudinal axis with adjustment of the blade pitch angle, the feedback device comprising a core and at least one position marker affixed to the core and extending along a direction angled relative to the longitudinal axis, the core made of a first material having a first magnetic permeability and the at least one position marker comprising a second material having a second magnetic permeability greater than the first magnetic permeability, and at least one sensor positioned adjacent the feedback device and configured for producing, as the feedback device rotates about the longitudinal axis, at least one sensor signal in response to detecting passage of the at least one position marker.

In some embodiments, the at least one position marker is at least one first position marker, and the feedback device further comprises a plurality of second position markers affixed to the core and fabricated from the first material, the second position markers circumferentially spaced around the feedback device and extending substantially parallel to the longitudinal axis with the at least one first position marker positioned between two adjacent ones of the second position markers.

In some embodiments, the at least one sensor is configured to produce the at least one sensor signal comprising at least one first series of pulses generated in response to detecting passage of the at least one first position marker, each pulse of the first series of pulses having a first amplitude above a predetermined threshold.

In some embodiments, the at least one sensor is configured to produce the at least one sensor signal comprising at least one second series of pulses generated in response to detecting passage of the second position markers, each pulse of the second series of pulses having a second amplitude above the predetermined threshold.

In some embodiments, the first amplitude is substantially equal to the second amplitude.

In some embodiments, the second material is applied to the at least one position marker using one of coating and plating.

In some embodiments, the second material is applied to at least part of the at least one position marker.

In some embodiments, the second material has a relative magnetic permeability between 80,000 and 100,000.

In accordance with yet another broad aspect, there is provided a method for providing feedback for an aircraft-bladed rotor, the rotor rotatable about a longitudinal axis and having blades with adjustable blade pitch angle. The method comprises receiving at least one sensor signal from at least one sensor positioned adjacent a feedback device coupled to rotate with the rotor and to move along the longitudinal axis with adjustment of the blade pitch angle, the feedback device comprising a core and at least one position marker affixed to the core and extending along a direction angled relative to the longitudinal axis, the core made of a first material having a first magnetic permeability and the at least one position marker comprising a second material having a second magnetic permeability greater than the first magnetic permeability, the at least one sensor signal produced by the at least one sensor in response to detecting passage of the at least one position marker as the at least one feedback rotates about the longitudinal axis, and processing the at least one sensor signal to generate a feedback signal indicative of the blade pitch angle of the rotor.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
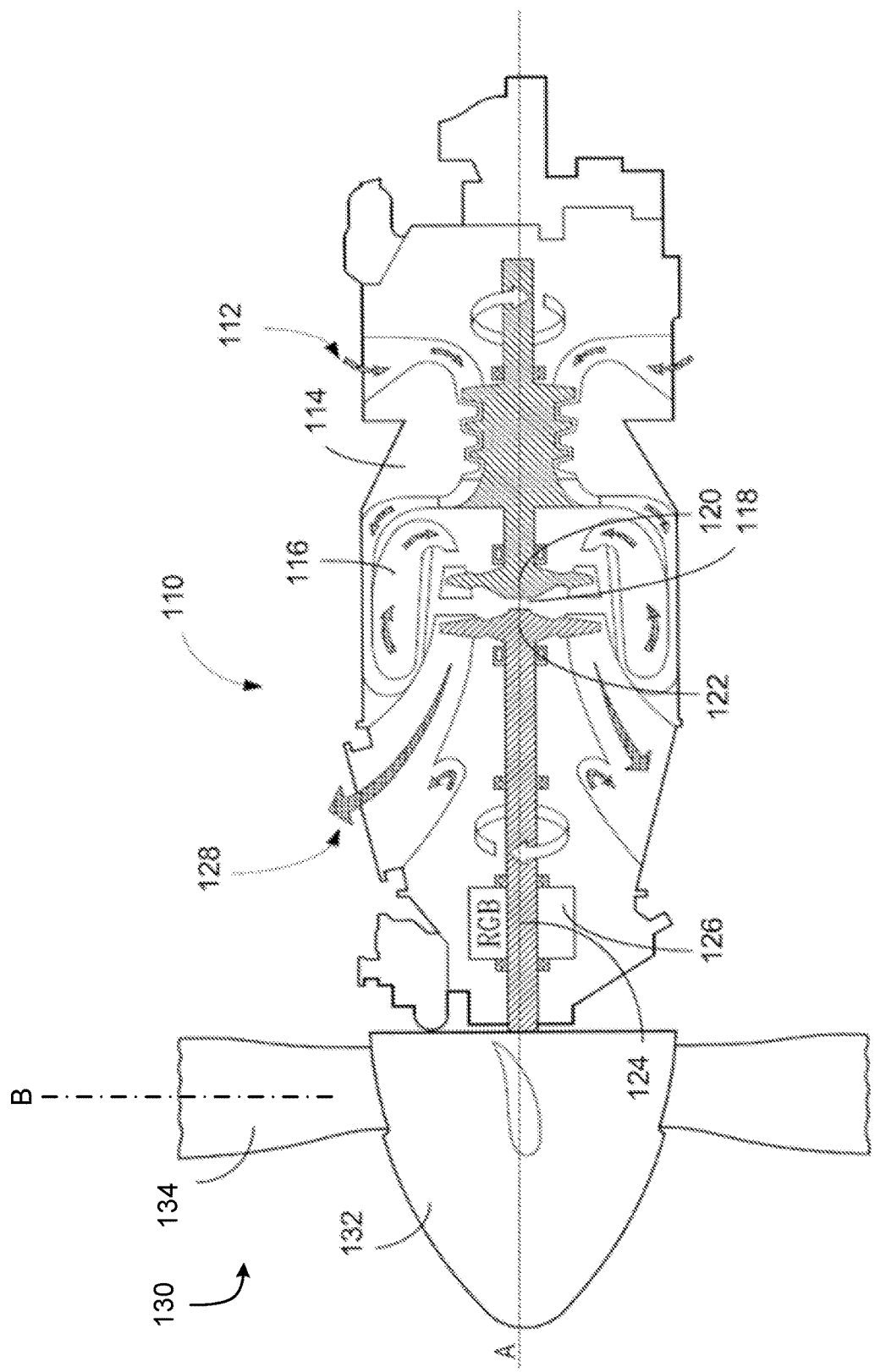
FIG. 1 is a schematic cross-sectional view of an example gas turbine engine.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Rotation of the output shaft 124 is facilitated by one or more bearing assemblies (not illustrated), which can be disposed within the RGB 126 or at any other suitable location. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades 134 connected to a hub by any suitable means and extending radially therefrom. The blades 134 are also each rotatable about their own radial axes 'B' through a plurality of blade angles, which can be changed to achieve modes of operation, such as feather, full reverse, and forward thrust.

Figure 2:
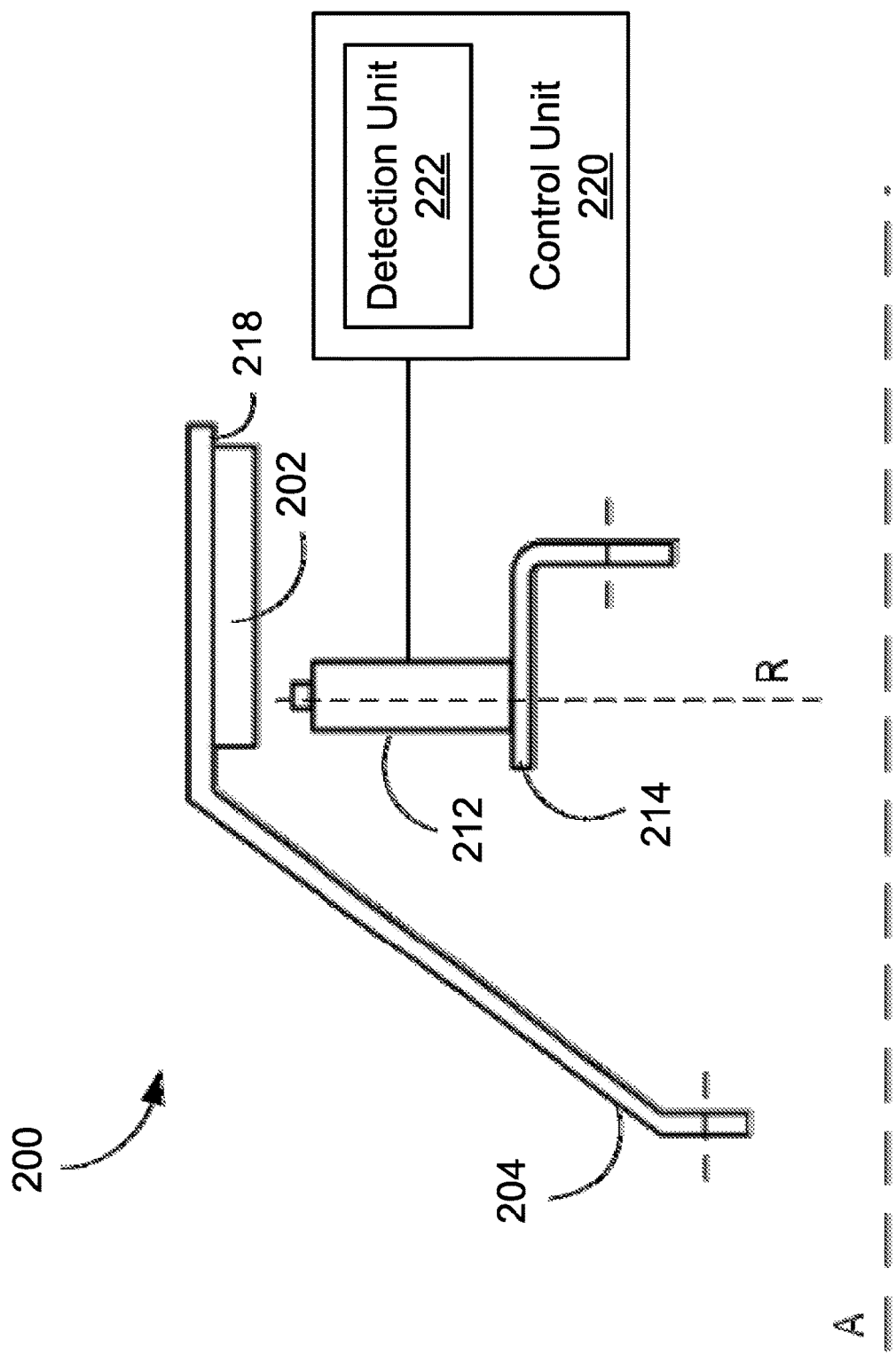
FIG. 2 is a schematic diagram of an example feedback sensing system.

With reference to FIG. 2, a feedback sensing system 200 for pitch-adjustable blades of bladed rotors of aircraft will now be described. The system 200 may be used for sensing a feedback device (also referred to as a feedback ring or phonic wheel) 204 of an aircraft propeller. It should however be understood that, although the system 200 is described and illustrated herein with reference to an aircraft propeller, such as the propeller 130 of FIG. 1, the system 200 may apply to other types of rotors, such as those of helicopters. The systems and methods described herein are therefore not limited to being used for aircraft propellers.

In some embodiments, the system 200 provides for detection and measurement of rotational velocity of one or more rotating elements of the engine 110 and of propeller blade angle on propeller systems, such as the propeller 130 of FIG. 1. The system 200 may interface to existing mechanical interfaces of typical propeller systems to provide a digital detection for electronic determination of the propeller blade angle. It should be noted that although the present disclosure focuses on the use of the system 200 and the feedback device 204 in gas-turbine engines, similar techniques can be applied to other types of engines, including, but not limited to, electric engines and hybrid electric propulsion systems having a propeller driven in a hybrid architecture (series, parallel, or series/parallel) or turboelectric architecture (turboelectric or partial turboelectric).

The system 200 comprises an annular member 204 and one or more sensors 212 positioned proximate the annular member 204. Annular member 204 (referred to herein as a feedback device) has a plurality of circumferentially-spaced apart and detectable features (also referred to as position markers or teeth) 202 disposed thereon for detection by sensor(s) 212. In some embodiments, the detectable features 202 and sensor(s) 212 may be disposed on a radially-outer side of feedback device 204. Alternatively, detectable features 202 and sensor(s) 212 could be disposed on a radially-inner side of feedback device 204. Several detectable features 202 may be spaced equiangularly about the perimeter (also referred to herein as the 'circumference') of the feedback device 204. Other embodiments may apply.

In one embodiment, the one or more sensors 212 are fixedly mounted to a static portion of the engine 110. In other embodiments, the one or more sensors 212 are mounted for rotation with propeller 130 and to move axially with adjustment of the blade angle of the blades of the propeller 130, and the feedback device 204 is fixedly mounted to a static portion of the engine 110.

In some embodiments, the feedback device 204 is mounted for rotation with propeller 130 and to move axially along rotation axis A to a plurality of axial positions, with adjustment of the blade angle of the blades 134 of the propeller 130. An axial position of the feedback device 204 may then correspond to a respective angular (pitch) position of the blades and the position markers 202 may be useful for detecting the axial position of the feedback device 204 as the feedback device 204 and bladed rotor 130 rotate. The feedback device 204 may therefore be useful for detecting the angular position of the adjustable blades by way of correlation.

The system 200 also includes a control unit 220 communicatively coupled to the one or more sensors 212. The sensor(s) 212 are configured for producing a sensor signal which is transmitted to or otherwise received by the control unit 220, for example via a detection unit 222 thereof. The sensor signal can be an electrical signal, digital or analog, or any other suitable type of signal. In some embodiments, the sensor(s) 212 produce a signal pulse in response to detecting the presence of a position marker 202 (and more particularly of at least one high magnetic permeability marker provided thereon, as will be discussed further below) in a sensing zone of the sensor 212. For example, the sensor 212 may be an inductive sensor that operates on detecting changes in magnetic flux, and may have a sensing zone which encompasses a circular or rectangular area or volume in front of the sensor 212. The position markers 202 provided on the feedback device 204 may then be made of any suitable material which would cause the passage of the position markers 202 near the sensor(s) 212 to provide a change in magnetic permeability within the magnetic field generated by the sensor 212. When a position marker 202 is present in the sensing zone, or passes through the zone during rotation of the feedback device 204, the magnetic flux in the sensing zone is varied by the presence of the position marker 202 (in other words, a change in magnetic permeability occurs), and the sensor(s) 212 can produce a signal pulse, which forms part of the sensor signal.

In the example illustrated in FIG. 2, a side view of a portion of feedback device 204 and sensor 212 is shown. The sensor 212 is mounted to a flange 214 of a housing of the reduction gearbox 126, so as to be positioned adjacent the plurality of position markers 202, which extend away from the feedback device 204 and towards the sensor 212. The sensor 212 may be mounted at any suitable angle relative to the position markers 202. In some embodiments, the sensor 212 is secured to the propeller 130 so as to extend away from the flange 214 and towards the position markers 202 along a radial direction, identified in FIG. 2 as direction 'R'. Sensor 212 and flange 214 may be fixedly mounted, for example to the housing of the reduction gearbox 126, or to any other static element of the engine 110, as appropriate. In some embodiments, a single sensor 212 is mounted in close proximity to the feedback device 204 and the position markers 202. In some other embodiments, in order to provide redundancy as well as multiple signal sources at different axial locations, one or more additional sensors, which may be similar to the sensor 212, are provided.

Figure 3:
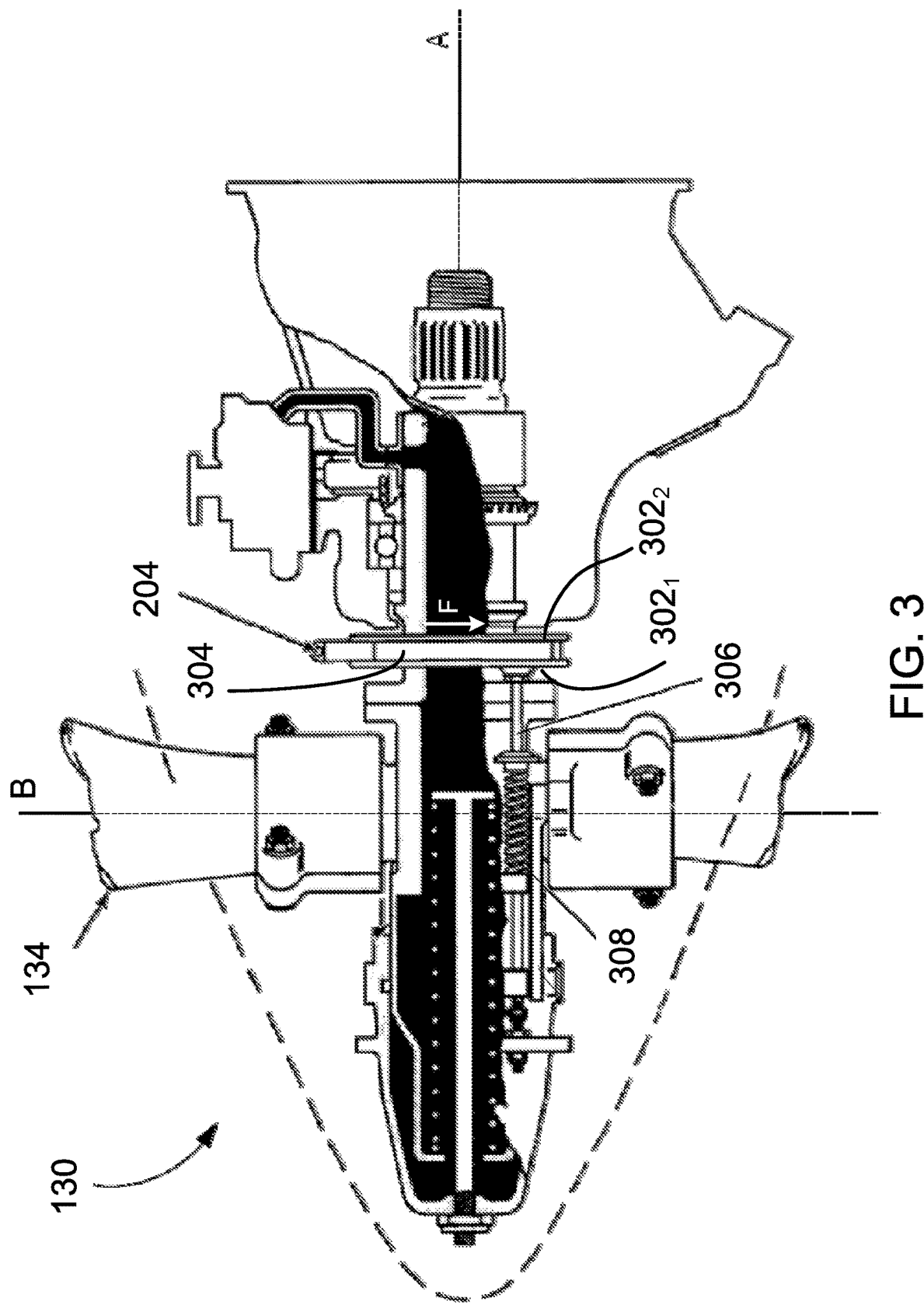
FIG. 3 is a schematic diagram of the propeller of FIG. 1 showing the feedback device of FIG. 2, in accordance with one embodiment.

With additional reference to FIG. 3, in some embodiments the feedback device 204 is embodied as a circular disk (or annular member) which rotates as part of the engine 110, for example with the propeller shaft 124 or with the propeller 130. The feedback device 204 comprises opposing faces (not shown) having outer edges $302_1$, $302_2$ and defines a surface 304 (referred to herein as a "root surface") which extends between the opposing faces and circumscribes them. Put differently, the root surface 304 of the feedback device 204 is the outer periphery of the feedback device 204 which spans between the two opposing faces and the root surface 304 intersects the faces at the edges $302_1$, $302_2$. In these embodiments, the position markers 202 can take the form of projections which extend from the root surface 304.

In one embodiment, the position markers 202 are integrally formed with the feedback device 204 so that the feedback device 204 may have a unitary construction. In another embodiment, the position markers 202 are manufactured separately from the feedback device 204 and attached thereto using any suitable technique, such as welding or the like.

It should also be noted that, although the present disclosure focuses primarily on embodiments in which the position markers 202 are projections, other embodiments are also considered. The position markers 202 may, for example, comprise one or more of protrusions, teeth, walls, voids, recesses, and/or other singularities. For instance, in some embodiments, the position markers 202 may be embedded in the circular disk portion of the feedback device 204, such that the feedback device 204 has a substantially smooth or uniform root surface 304. A position marker 202 can then be a portion of the feedback device 204 which is made of a different material, or to which is applied a layer of a different material. The position markers 202 may then be applied to the root surface 304, for instance as strips of metal or other material for detection by the sensor 212, which can be an inductive sensor capable of sensing changes in magnetic flux (as discussed above) or any other suitable sensor such as a Hall sensor or a variable reluctance sensor. Still other embodiments are considered.

With continued additional reference to FIG. 3, the feedback device 204 is supported for rotation with the propeller 130, which rotates about the longitudinal axis A. The feedback device 204 is also supported for longitudinal sliding movement along the axis A, e.g. by support members, such as a series of circumferentially spaced feedback rods 306 that extend along the axis A. A compression spring 308 surrounds an end portion of each rod 306.

As depicted in FIG. 3, the propeller 130 comprises a plurality of angularly arranged blades 134, each of which is rotatable about a radially-extending axis B through a plurality of adjustable blade angles, the blade angle being the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full (or maximum) reverse mode is associated with negative blade angles.

Figure 4:
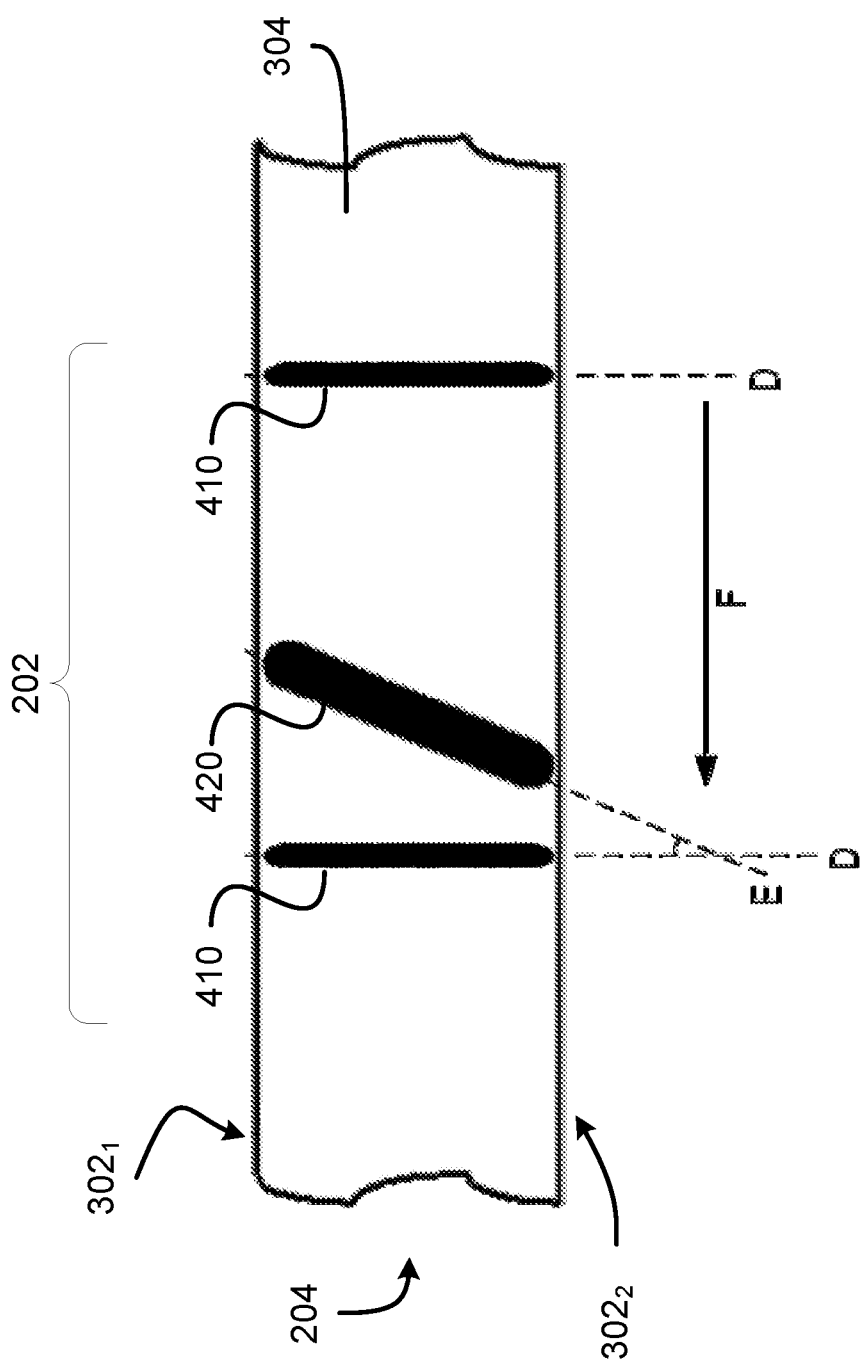
FIG. 4 is a schematic view of an inner surface of the feedback device of FIG. 2, in accordance with one embodiment.

Referring now to FIG. 4 in addition to FIG. 2 and FIG. 3, the feedback device 204 illustratively comprises position markers 202, which, in one embodiment, can take the form of projections which extend from the root surface 304. In one embodiment, the position markers 202 may comprise a plurality of first projections 410 (referred to herein as "straight" projections or markers) arranged along a direction 'ID', which is substantially transverse to the opposing edges $302_1$, $302_2$. Although only two projections 410 are illustrated, it should be understood that any suitable number of projections 410 may be present across the whole of the root surface 304. In one embodiment, the projections 410 may be substantially equally spaced from one another on the root surface 304. In addition, the projections 410 may, in some embodiments, be of substantially a common shape and size, for example having a common volumetric size. Still, other embodiments are considered.

The position markers 202 may also comprise at least one supplementary (or second) projection 420 (referred to herein as an "angled" or "slanted" projection/marker) which is positioned between two adjacent ones of the first projections 410. Each second projection is illustratively oriented along a direction 'E', which is at an angle relative to the direction 'D' along which the first projections are arranged. The angle between directions 'D' and 'E' can be any suitable value between 1° and 89°, for example 30°, 45°, 60°, or any other value, as appropriate. In some embodiments, the feedback device 204 includes only a single supplementary projection 420. In other embodiments, the feedback device 204 can include more than one (e.g., two, three, four, or more) supplementary projection 420. In embodiments in which the feedback device 204 includes more than one supplementary projection 420, the supplementary projections 420 can all be oriented along a common orientation, for instance direction 'E', or can be oriented along one or more different orientations. The projection 420 can be located at substantially a midpoint between two adjacent projections 410, or, as shown in FIG. 4, can be located close to a particular one of two adjacent projections 410. Other embodiments may apply.

The signal pulses produced by the sensor 212, which form part of the electrical signal received by the control unit 220, can be used to determine various operating parameters of the engine 110 and the propeller 130. In particular, the sensors signal generated by the sensor 212 illustratively comprises a first series of pulses generated in response to detecting the first projections 410 and a second series of pulses generated in response to detecting the second projection(s) 420. The spacing of the first projections 410 (which may, or may not, be regular) can, for example, be used to determine a speed of rotation of the feedback device 204. In addition, the second projection(s) 420 can be detected by the sensor 212 to determine a blade angle of the propeller 130.

With continued reference to FIG. 2 and FIG. 3, and FIG. 4, as the feedback device 204 rotates, varying portions thereof enter, pass through, and then exit the sensing zone of the one or more sensors 212. From the perspective of the sensor(s) 212, the feedback device 204 moves axially along axis A and rotates about direction 'F' (shown in FIG. 4). With axial travel of the feedback device 204, the one or more sensors 212 are therefore positioned adjacent to different portions of the feedback device 204. In particular, a given sensor 212 is adjacent the edge $302_2$ (also referred to as the 'engine side') when the propeller (reference 130 in FIG. 1) is in a primary blade angle position. When the propeller 130 is in the maximum reverse condition, the sensor 212 is adjacent the edge $302_1$ (also referred to as the 'propeller side'). The longitudinal (or beta) position (along axis A) of the feedback device 204 relative to the sensor 212 therefore varies with movement of the feedback ring 204. However, as the sensor 212 is positioned adjacent to the edges $302_1$, $302_2$ with movement of the feedback ring 204, a drop in magnetic flux occurs. This results in a so-called "edge-effect" that leads to an increase in reading error (also referred to herein as beta error) at the edges $302_1$, $302_2$, particularly as the feedback device 204 moves away from the sensor 212.

In addition, as the feedback device 204 rotates, the change in magnetic flux caused by the presence of an angled marker 420 in the sensing zone of the sensor 212 may be different than that caused by the presence of a straight marker 410. For example, the change in magnetic flux produced by the presence of the angled marker 420 may be less than the change in magnetic flux produced by the presence of one of the straight markers 410. As a result, the signal pulse (referred to herein as a second signal pulse) produced in response to the sensor 212 detecting the presence of the angled marker 420 may have an amplitude (e.g. peak amplitude) that is smaller, or less pronounced, than the amplitude of a corresponding signal pulse (referred to herein as a first signal pulse) produced in response to the sensor 212 detecting the presence of the straight marker 410. The uneven nature of the first and second signal pulses can complicate signal processing of the signal produced by the sensor 212, for example for the control unit 220, and can lead to inaccurate measurements.

In order to permit the sensor 212 to accurately detect the passage of the position markers 202 without any edge-related effects while maintaining a constant magnetic air gap as the position of the feedback device 204 varies, it is proposed herein to increase the strength (i.e. amplify) the second signal pulse that is generated by the sensor 212 for improved detection of the angled marker(s) 420. For this purpose, the angled marker(s) 420 are configured so as to comprise a material (referred to herein as a "high magnetic permeability material") which increases the change in magnetic flux generated by the passage of the angled marker(s) 420 in the sensing zone of the sensor 212. The feedback device 204 may indeed comprise a core (not shown) made of a first material, preferably a metallic or ferromagnetic material (including, but not limited to, steel) having a first magnetic permeability. The core illustratively includes the root surface 304. The angled marker(s) 420 may comprise a second material (or high magnetic permeability material) having a second magnetic permeability higher than the first magnetic permeability. The resulting angled marker(s) 420 are referred to herein as "high magnetic permeability marker(s)" or "angled high magnetic permeability marker(s)".

It should be understood that, as used herein, the term "high magnetic permeability material" does not necessarily denote a particular value for magnetic permeability, nor a particular range of magnetic permeability values. Rather, reference to the high magnetic permeability material is in contrast with the material that makes up the core of the feedback device as in 204. In one embodiment, Mu-metal (which has relative magnetic permeability values of 80,000 to 100,000 compared to several thousand for ordinary steel) is used as the high magnetic permeability material. As known to those skilled in the art, materials, such as Mu-metal, provide a path for magnetic field lines around the area covered by the material. It should however be understood that materials other than Mu-metal may apply. Materials including, but not limited to, ferrite ceramics, permalloy, and supermalloy, may apply. Nickel may also be used.

In one embodiment, the characteristics (e.g., type, thickness, surface area) of the high magnetic permeability material are selected such that the amplitude of the second signal pulse is increased to a predetermined threshold value above which the second signal pulse may not be confused with noise. In particular, when the amplitude of a given sensor signal pulse is below the threshold value, the sensor signal pulse may not be accurately read by the detection unit (reference 222 in FIG. 2) and is accordingly ignored whereas, when the amplitude of the given sensor signal pulse is above the threshold value, the sensor signal pulse is accurately read by the detection unit 222. In other words, without providing the angled marker(s) 420 with the high magnetic permeability material, the amplitude of the second signal pulse is illustratively below (e.g., less than or equal to) the threshold value while the amplitude of the first signal pulse is above the threshold value. After the angled marker(s) 420 are provided with the high magnetic permeability material, the amplitude of the first signal pulse and the amplitude of the second signal pulse are above the threshold value, allowing the detection unit 222 to accurately detect both the first and the second signal pulses.

In one embodiment, the high magnetic permeability material is chosen to increase the amplitude of the second signal pulse so that the second signal pulse substantially matches (or equals) the first signal pulse. It should be noted that, as used herein, the terms "match" and "equal" are understood to refer to substantial equivalence to within a particular tolerance or range. An electrical signal pulse produced by an angled marker 420 can be considered equal to an electrical signal pulse produced by the straight marker 410 if it has an amplitude within any suitable tolerance (e.g., 1%, 5%, 10%, 15%, 20%, or any other suitable amount). For instance, if the angled marker 420 produces an electrical signal pulse with an amplitude of 0.95 Volt (V), this can be considered equal to an electrical signal pulse with an amplitude of approximately 1 V produced by the straight markers 410, and the magnetic flux response of the projections 410 and the projection 420 are said to match. It should however be understood that it is desirable for the strength of the second signal to be increased above a given threshold and the second signal pulse need not necessarily match the first signal pulse as a result of the signal amplification.

In one embodiment, all angled markers 420 are provided with the high magnetic permeability material. It should however be understood that the number of angled high magnetic permeability markers that are provided on the feedback device 204 may depend on factors including, but not limited to, engine configuration and required accuracy for blade angle calculation. Indeed, providing an increased number of angled high magnetic permeability markers may allow to increase accuracy. In addition, as will be discussed further below, the high magnetic permeability material may be applied to at least part of the angled marker(s) 420 and the surface area to which the high magnetic permeability material is applied may depend on a number of factors. For example, applying the high magnetic permeability material on the entire exposed surface of a given angled marker 420 may allow to maximize the strength of the resulting sensor signal. Also, applying the high magnetic permeability material to only a top surface and part of the sides of the angled marker 420 (the top surface and sides being adjacent the sensor(s) 212) may allow to increase magnetic flux.

The angled high magnetic permeability markers may be provided using any suitable process. The high magnetic permeability material may be coated (e.g., using traditional coating, intermolecular coating, or the like) on at least part of the angled marker(s) 420 to create the angled high magnetic permeability marker(s), as will be discussed below. Alternatively, the high magnetic permeability material may be plated (e.g., using electro-plating, electro-forming, or the like) on at least part of the angled marker(s) 420 to create the angled high magnetic permeability marker(s). Additive manufacturing may also be used to deposit the high magnetic permeability material. The angled high magnetic permeability markers may also be manufactured using (i.e. made of) the high magnetic permeability material.

In one embodiment, an intermolecular coating, such as a nanocrystalline metallic coating (also referred to herein as a nano-metal coating), is applied to at least part of the angled marker(s) 420 in order to provide the angled high magnetic permeability markers. For example, the nano-metal coating may be applied to the angled marker(s) 420 so as to form an outer shell that envelopes (in part or in full) the angled marker(s) 420. The nano-metal coating may thus define at least part of an exposed (or outer) surface of the angled marker(s) 420. The nano-metal coating may include a single layer topcoat of a nano-scale, fine grained high magnetic permeability metal. The nano-metal coating may have an average grain size at least in the range of between about 1 nm and about 5000 nm. In a particular embodiment, the nano-metal coating has an average grain size of between about 10 nm and about 500 nm. More preferably, in another embodiment, the nano-metal coating has an average grain size of between about 10 nm and about 50 nm, and more preferably still an average grain size of between about 10 nm and about 25 nm. A thickness of a single layer of nano-metal coating may range from about 0.001 inch (0.0254 mm) to about 0.020 inch (0.508 mm). The thickness of the nano-metal coating is therefore smaller than that of traditional coatings, which may allow to maintain the required air gap.

Any suitable number of layers of nano-metal coating may be provided, including, but not limited to, one or more layers of different grain size, and/or a thicker layer having graded average grain size and/or graded composition within the layer. It should be understood that the properties (e.g., average grain size, thickness) of the nano-metal coating may depend on the tolerance stack-up and available space according to clearances available in the design of the feedback device 204 as well as on the required measurement (e.g., blade angle measurement) accuracy (e.g., on the amount of beta error). In addition, the properties of the nano-metal coating may be modified in specific regions of the coating (i.e. may not be uniform throughout the angled marker(s) 420) in order to provide a structurally optimum feedback device 204. For example, the nano-metal coating may be formed thicker in regions known to be more structural and/or more erosion demanding of the angled marker(s) 420 and thinner in other less demanding regions.

Any suitable coating process, including, but not limited to, a plating technique, may be used to deposit the high magnetic permeability material. In one embodiment, the nano-metal coating is applied directly to the angled marker(s) 420. Auxiliary processes to improve plating adhesion of the nano-metal coating to the angled marker(s) 420 may also be used. Such processes may include, but are not limited to, surface activation, surface texturing, applied resin and surface roughening. Alternatively, a layer of intermediate bond coat may be disposed (e.g., by electroplating or other suitable process) on the angled marker(s) 420 before the nano-metal coating is applied thereto, thereby improving adhesion and the coating process. Other embodiments may apply.

Figure 5A:
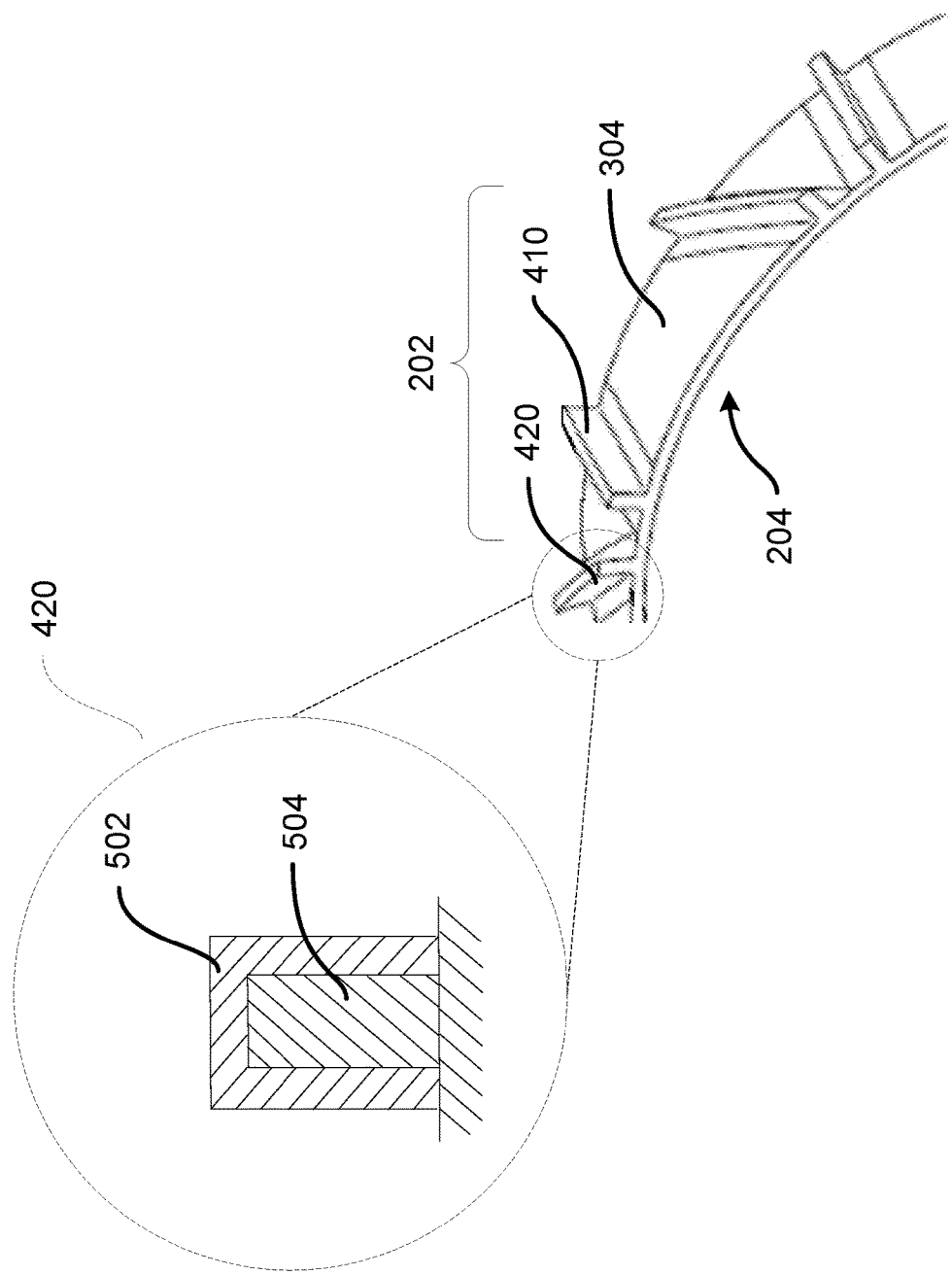
FIG. 5A is a schematic diagram of a feedback device with a high magnetic permeability marker provided thereon, in accordance with one embodiment.
Figure 5B:
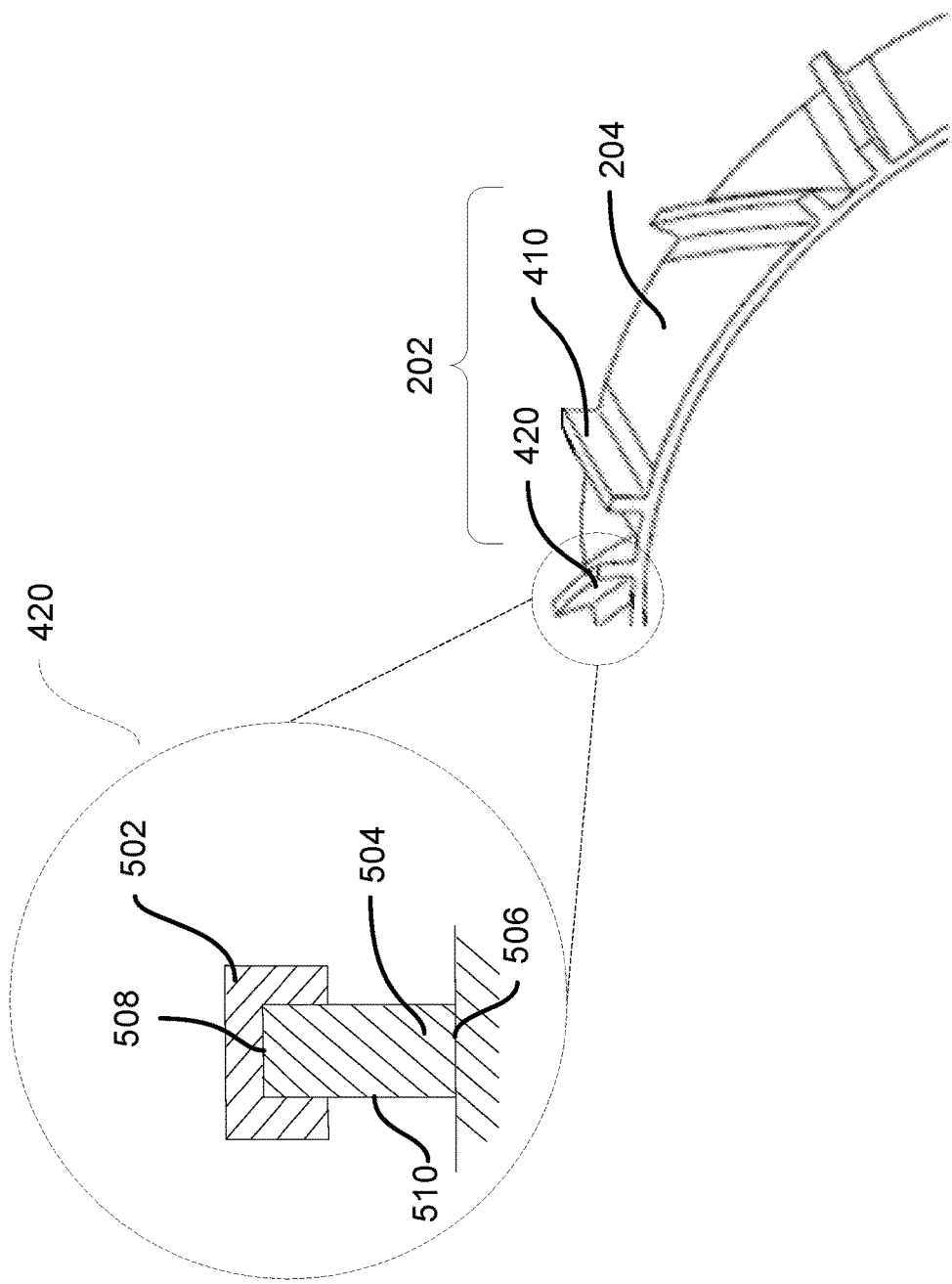
FIG. 5B is a schematic diagram of a feedback device with a high magnetic permeability marker provided thereon, in accordance with another embodiment.
Figure 5C:
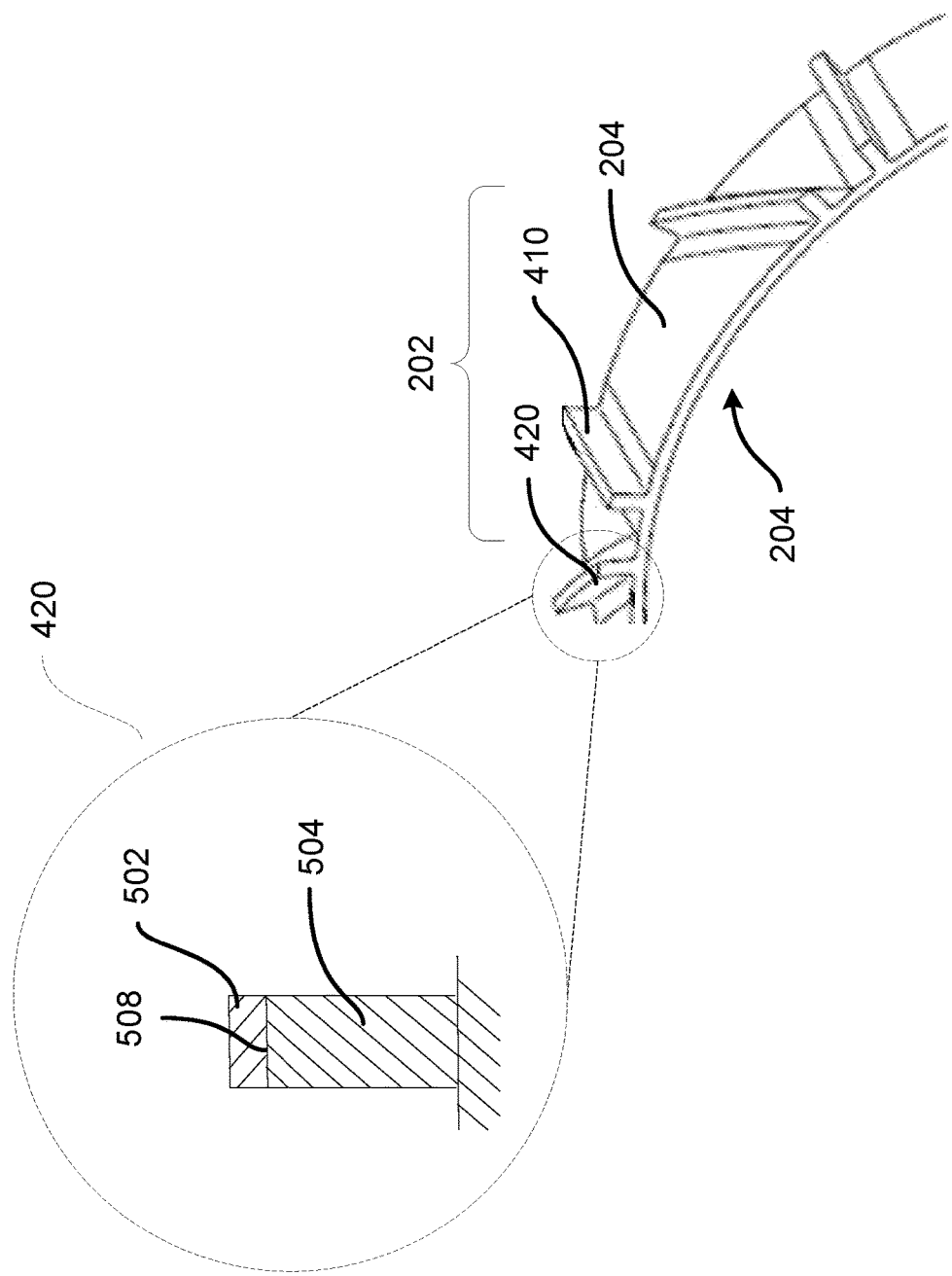
FIG. 5C is a schematic diagram of a feedback device with a high magnetic permeability marker provided thereon, in accordance with yet another embodiment.
Figure 5D:
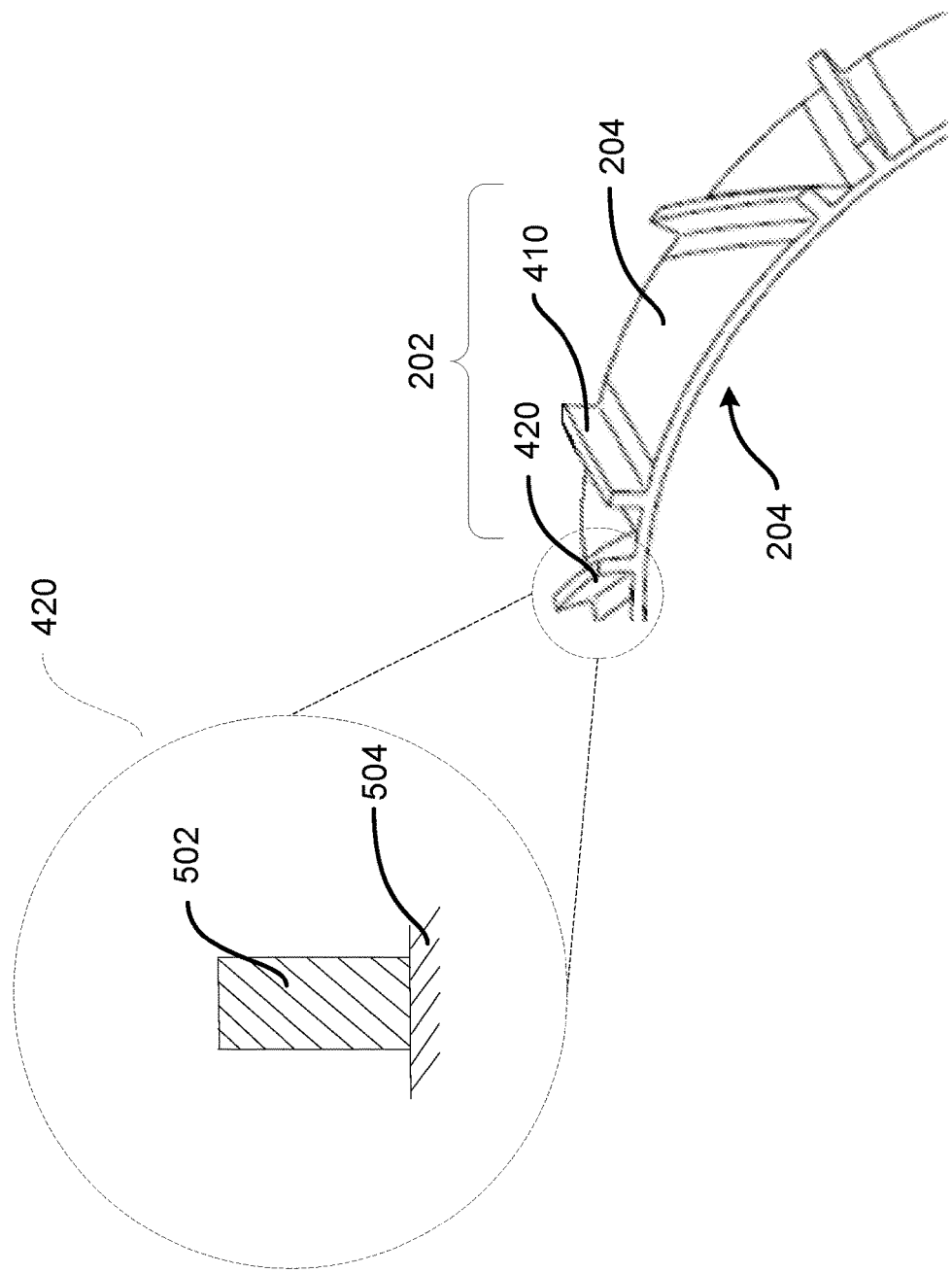
FIG. 5D is a schematic diagram of a feedback device with a high magnetic permeability marker provided thereon, in accordance with yet another embodiment.

As discussed herein above, at least part of the angled marker 420 may comprise a high magnetic permeability material 502. In one embodiment (as shown in FIG. 5A, FIG. 5B, and FIG. 5C), the angled marker 420 and the remainder of the feedback device 204 (including the straight markers 410) are made of a metallic (e.g., ferromagnetic) material 504 to which the high magnetic permeability material 502 is applied. In one embodiment, the material 504 has a magnetic permeability that is lower than that of the material 502, but that is sufficient to enable detection by the sensor 212. In the embodiment of FIG. 5A, the high magnetic permeability material 502 may be applied to an entire exposed surface (not shown) of the angled marker 420, so as to fully cover the angled marker 420. Alternatively and as shown in FIG. 5B and FIG. 5C, the high magnetic permeability material 502 may be applied to part of the angled marker 420, which extends from a base 506 to a tip 508 and has sides 510. In the embodiment illustrated in FIG. 5B, the high magnetic permeability material 502 is applied to the tip 508 and a portion of the sides 510, the tip 508 and portion of the sides 510 being positioned adjacent the sensor(s) (reference 212 in FIG. 2A) as the feedback device 204 rotates. In the embodiment of FIG. 5C, the high magnetic permeability material 502 is applied to an upper portion of the feedback device's exposed surface, i.e. to the tip 508 of the angled marker 420 only. In yet another embodiment illustrated in FIG. 5D, the angled marker 420 itself may be made of the high magnetic permeability material 502 while the remainder of the feedback device 204 (including the straight markers 410) is made of the lower magnetic permeability material 504. Other embodiments may apply.

From the above, it can be seen that, in one embodiment, providing the angled high magnetic permeability markers may allow to amplify the second sensor signal pulse generated upon the sensor 212 detecting passage of the angled marker(s) 420, while maintaining the total required air gap of the magnetic circuit as the position of the feedback device 204 varies. As will be understood by a person skilled in the art, the total air gap of the magnetic circuit is substantially equal to the sum of the spacing (or air gap) between an outer surface (not shown) of the feedback device 204 and an upper magnetic pole (not shown) of the sensor 212 and the spacing between an inner surface (not shown) of the feedback device 204 and a bottom magnetic pole (not shown) of the sensor 212. Since maintaining the air gap affects magnetic flux density and signal quality, the proposed configuration of the feedback device 204 (i.e. provision of the angled high magnetic permeability markers) may allow for improved reading accuracy. Moreover, edge-related effects may be mitigated (i.e. reduced).

Figure 6:
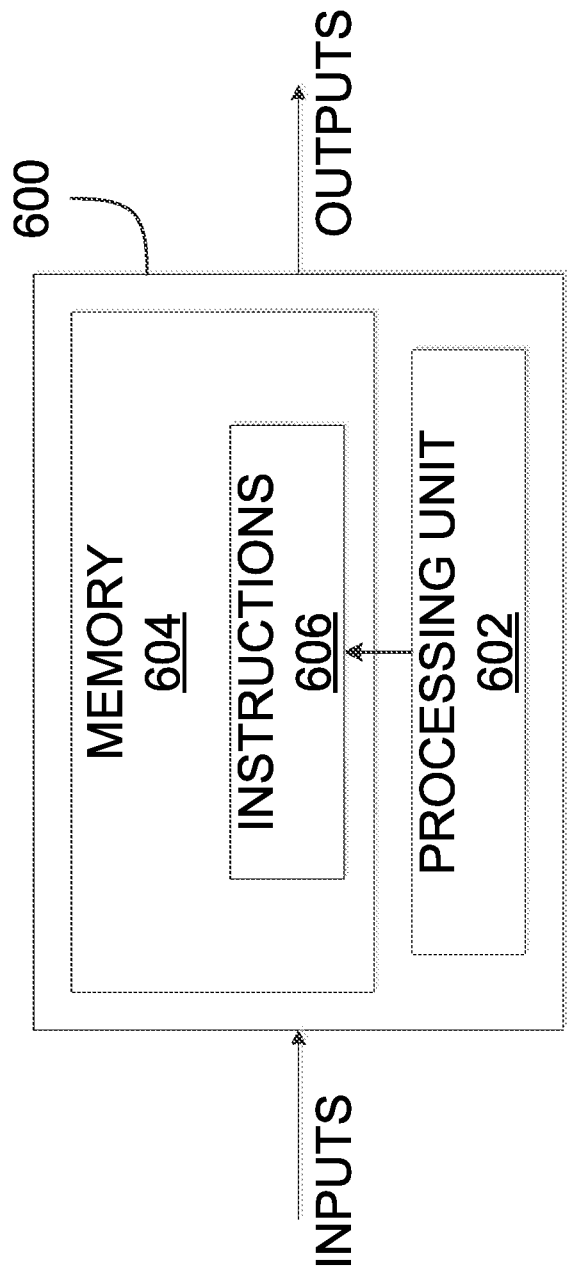
FIG. 6 is a block diagram of an example computing system for implementing the control unit of FIG. 2, in accordance with an embodiment.

FIG. 6 is an example embodiment of a computing device 600 for implementing the control unit 220 described above with reference to FIG. 2. The computing device 600 comprises a processing unit 602 and a memory 604 which has stored therein computer-executable instructions 606. The processing unit 602 may comprise any suitable devices configured to cause a series of steps to be performed such that instructions 606, when executed by the computing device 600 or other programmable apparatus, may cause the functions/acts/steps specified in the method described herein to be executed. The processing unit 602 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems described herein may be implemented in a high level procedural or object oriented programming or scripting language, or a combination thereof, to communicate with or assist in the operation of a computer system, for example the computing device 600. Alternatively, the methods and systems may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 602 of the computing device 600, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A blade angle feedback system for a bladed rotor of an aircraft engine, the bladed rotor rotatable about an axis and having blades rotatable about respective spanwise axes to adjust a blade angle thereof, the blade angle feedback system comprising:
a feedback device comprising a core, at least one first position marker affixed to the core and extending along a direction angled relative to the axis of the bladed rotor, and a plurality of second position markers affixed to the core and extending substantially parallel to the axis, the core and the plurality of second position markers made of a first material having a first magnetic permeability and the at least one first position marker comprising a second material having a second magnetic permeability greater than the first magnetic permeability;
at least one sensor configured for producing at least one sensor signal upon detecting a relative movement between the at least one first position marker, the plurality of second position markers, and the at least one sensor, the at least one sensor signal indicative of the blade angle of the blades; and
a control unit communicatively coupled to the at least one sensor and configured to generate a feedback signal indicative of the blade angle in response to the at least one sensor signal received from the at least one sensor.

2. The feedback system of claim 1, wherein the second position markers are circumferentially spaced around the feedback device and the at least one first position marker is positioned between two adjacent ones of the second position markers.

3. The feedback system of claim 2, wherein the at least one sensor is configured to produce the at least one sensor signal comprising at least one first series of pulses generated in response to detecting passage of the at least one first position marker, each pulse of the first series of pulses having a first amplitude above a predetermined threshold.

4. The feedback system of claim 3, wherein the at least one sensor is configured to produce the at least one sensor signal comprising at least one second series of pulses generated in response to detecting passage of the second position markers, each pulse of the second series of pulses having a second amplitude above the predetermined threshold.

5. The feedback system of claim 4, wherein the first amplitude is substantially equal to the second amplitude.

6. The feedback system of claim 1, wherein the second material is applied to the at least one first position marker using one of coating and plating.

7. The feedback system of claim 1, wherein the second material is applied to an entire exposed surface of the at least one first position marker.

8. The feedback system of claim 1, wherein the second material is applied to at least a tip of the at least one first position marker.

9. The feedback system of claim 1, wherein the second material has a relative magnetic permeability between 80,000 and 100,000.

10. The feedback system of claim 1, wherein the feedback device is mounted to rotate with the rotor and to move along the axis with the adjustment of the blade angle, and wherein the at least one sensor is mounted to a stationary structure adjacent the feedback device and configured for producing, as the feedback device rotates about the axis, the at least one sensor signal in response to detecting passage of the at least one first position marker and the plurality of second position markers.

11. An aircraft-bladed rotor system, comprising:
a rotor rotatable by a shaft about an axis, the rotor having blades with adjustable blade pitch angle;
a feedback device comprising a core, at least one first position marker affixed to the core and extending along a direction angled relative to the axis, and a plurality of second position markers affixed to the core and extending substantially parallel to the axis, the core and the plurality of second position markers made of a first material having a first magnetic permeability and the at least one first position marker comprising a second material having a second magnetic permeability greater than the first magnetic permeability; and
at least one sensor configured for producing at least one sensor signal upon detecting a relative movement between the at least one first position marker, the plurality of second position markers, and the at least one sensor, the at least one sensor signal indicative of the blade pitch angle of the blades.

12. The rotor system of claim 11, wherein the second position markers are circumferentially spaced around the feedback device and the at least one first position marker is positioned between two adjacent ones of the second position markers.

13. The rotor system of claim 12, wherein the at least one sensor is configured to produce the at least one sensor signal comprising at least one first series of pulses generated in response to detecting passage of the at least one first position marker, each pulse of the first series of pulses having a first amplitude above a predetermined threshold.

14. The rotor system of claim 13, wherein the at least one sensor is configured to produce the at least one sensor signal comprising at least one second series of pulses generated in response to detecting passage of the second position markers, each pulse of the second series of pulses having a second amplitude above the predetermined threshold.

15. The rotor system of claim 14, wherein the first amplitude is substantially equal to the second amplitude.

16. The rotor system of claim 11, wherein the second material is applied to the at least one first position marker using one of coating and plating.

17. The rotor system of claim 11, wherein the second material is applied to at least part of the at least one first position marker.

18. The rotor system of claim 11, wherein the second material has a relative magnetic permeability between 80,000 and 100,000.

19. The rotor system of claim 11, wherein the feedback device is mounted to rotate with the rotor and to move along the axis with the adjustment of the blade pitch angle, and wherein the at least one sensor is mounted to a stationary structure adjacent the feedback device and configured for producing, as the feedback device rotates about the axis, the at least one sensor signal in response to detecting passage of the at least one first position marker and the plurality of second position markers.

20. A method for providing feedback for an aircraft-bladed rotor, the rotor rotatable about a longitudinal axis and having blades with adjustable blade pitch angle, the method comprising:
receiving at least one sensor signal from at least one sensor positioned adjacent a feedback device coupled to rotate with the rotor and to move along the longitudinal axis with adjustment of the blade pitch angle, the feedback device comprising a core, at least one first position marker affixed to the core and extending along a direction angled relative to the longitudinal axis, and a plurality of second position markers affixed to the core and extending substantially parallel to the axis, the core and the plurality of second position markers made of a first material having a first magnetic permeability and the at least one first position marker comprising a second material having a second magnetic permeability greater than the first magnetic permeability, the at least one sensor signal produced by the at least one sensor in response to detecting passage of the at least one first position marker and the plurality of second position markers as the feedback device rotates about the longitudinal axis; and processing, at a control unit communicatively coupled to the at least one sensor, the at least one sensor signal to generate a feedback signal indicative of the blade pitch angle of the rotor.

\* \* \* \* \*